March 17, 1970     B. J. MATEJCZYK     3,500,558
DEVICE FOR THE TEACHING OF NUMERATION SYSTEMS TO ALL BASES
Filed Dec. 8, 1967     4 Sheets-Sheet 1

BASE 2-(1 BEAD)
SYMBOLS 0,1

| | 6TH | 5TH | 4TH | 3RD | 2ND | 1ST |
|---|---|---|---|---|---|---|
| | $2^5$ | $2^4$ | $2^3$ | $2^2$ | $2^1$ | $2^0$ |
| PLACE VALUE | 32 | 16 | 8 | 4 | 2 | 1 |

BASE 3-(2 BEADS)
SYMBOLS 0,1,2

| | 6TH | 5TH | 4TH | 3RD | 2ND | 1ST |
|---|---|---|---|---|---|---|
| | $3^5$ | $3^4$ | $3^3$ | $3^2$ | $3^1$ | $3^0$ |
| PLACE VALUE | 243 | 81 | 27 | 9 | 3 | 1 |

INVENTOR
BLAIR J. MATEJCZYK

By
Parmelee, Utzler & Walsh.
Attorneys

March 17, 1970     B. J. MATEJCZYK     3,500,558

DEVICE FOR THE TEACHING OF NUMERATION SYSTEMS TO ALL BASES

Filed Dec. 8, 1967     4 Sheets-Sheet 2

Fig. 4.

BASE 4-(3 BEADS) SYMBOLS 0,1,2,3

| | 6TH | 5TH | 4TH | 3RD | 2ND | 1ST |
|---|---|---|---|---|---|---|
| | $4^5$ | $4^4$ | $4^3$ | $4^2$ | $4^1$ | $4^0$ |
| PLACE VALUE | 1024 | 256 | 64 | 16 | 4 | 1 |

Fig. 5.

BASE 5-(4 BEADS) SYMBOLS 1,2,3,4

| | 6TH | 5TH | 4TH | 3RD | 2ND | 1ST |
|---|---|---|---|---|---|---|
| | $5^5$ | $5^4$ | $5^3$ | $5^2$ | $5^1$ | $5^0$ |
| PLACE VALUE | 3125 | 625 | 125 | 25 | 5 | 1 |

Fig. 6.

BASE 6-(5 BEADS) SYMBOLS 0,1,2,3,4,5

| | 6TH | 5TH | 4TH | 3RD | 2ND | 1ST |
|---|---|---|---|---|---|---|
| | $6^5$ | $6^4$ | $6^3$ | $6^2$ | $6^1$ | $6^0$ |
| PLACE VALUE | 7776 | 1296 | 216 | 36 | 6 | 1 |

Fig. 7.

BASE 7-(6 BEADS) SYMBOLS 0,1,2,3,4,5,6

| | 6TH | 5TH | 4TH | 3RD | 2ND | 1ST |
|---|---|---|---|---|---|---|
| | $7^5$ | $7^4$ | $7^3$ | $7^2$ | $7^1$ | $7^0$ |
| PLACE VALUE | 16807 | 2401 | 343 | 49 | 7 | 1 |

Fig. 8.

BASE 8-(7 BEADS) 0,1,2,3,4,5,6,7

| | 6TH | 5TH | 4TH | 3RD | 2ND | 1ST |
|---|---|---|---|---|---|---|
| | $8^5$ | $8^4$ | $8^3$ | $8^2$ | $8^1$ | $8^0$ |
| PLACE VALUE | 32768 | 4096 | 512 | 64 | 8 | 1 |

Fig. 9.

BASE 9-(8 BEADS) 0,1,2,3,4,5,6,7,8

| | 6TH | 5TH | 4TH | 3RD | 2ND | 1ST |
|---|---|---|---|---|---|---|
| | $9^5$ | $9^4$ | $9^3$ | $9^2$ | $9^1$ | $9^0$ |
| PLACE VALUE | 59049 | 6561 | 729 | 81 | 9 | 1 |

Fig. 10.

BASE 10-(9 BEADS) 0,1,2,3,4,5,6,7,8,9

| | $10^5$ | $10^4$ | $10^3$ | $10^2$ | $10^1$ | $10^0$ |
|---|---|---|---|---|---|---|
| PLACE VALUE | 100,000 | 10,000 | 1,000 | 100 | 10 | 1 |

INVENTOR
BLAIR J. MATEJCZYK

By Parmelee, Utzler & Welsh
Attorneys.

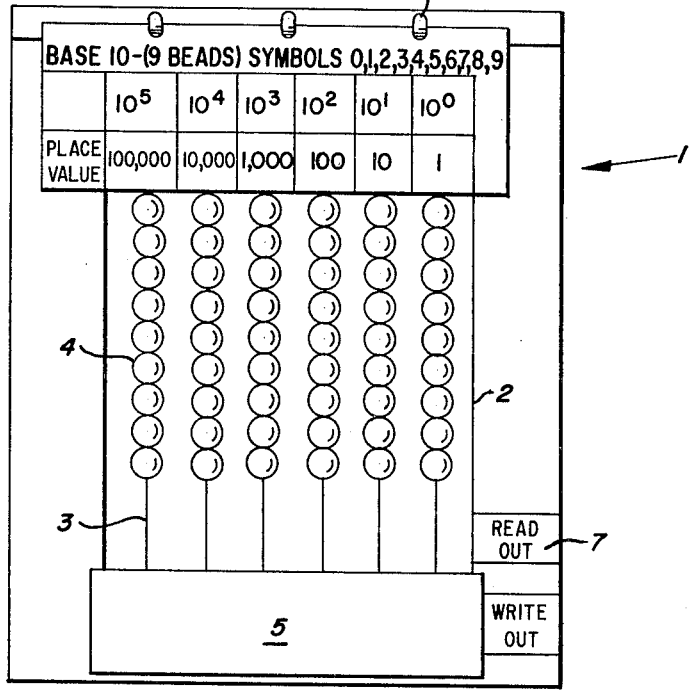
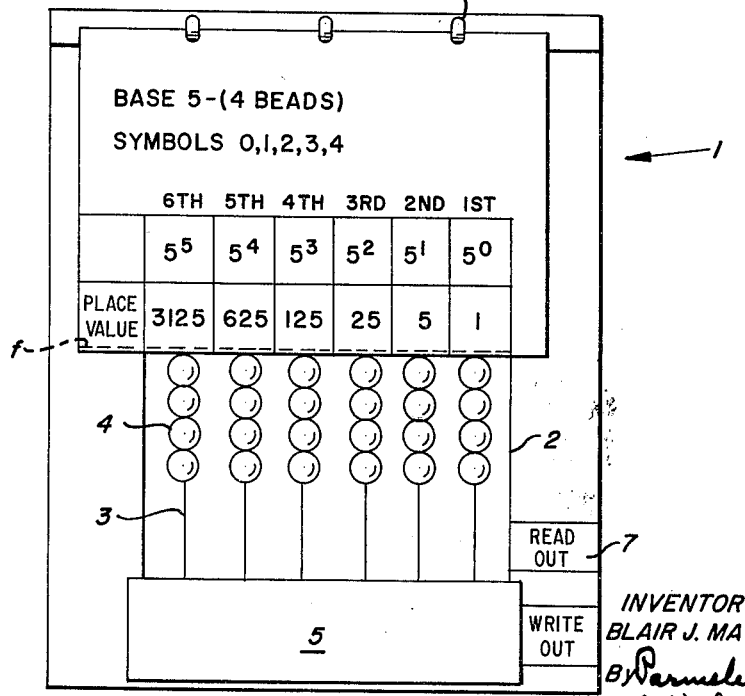

United States Patent Office 3,500,558
Patented Mar. 17, 1970

3,500,558
DEVICE FOR THE TEACHING OF NUMERATION SYSTEMS TO ALL BASES
Blair J. Matejczyk, 226 Ross Ave., Cambridge Springs, Pa. 16403
Filed Dec. 8, 1967, Ser. No. 689,059
Int. Cl. G09b 19/02
U.S. Cl. 35—32        4 Claims

ABSTRACT OF THE DISCLOSURE

A device for self-instruction or teaching of others computing in base ten or other bases, which is readily adjustable to the desired base and embodies vertical rows of beads mounted upon wires with hinged indexing cards which selectively cover portions of the beads of each wire and indicate the base chosen for use of the exposed beads.

BACKGROUND OF THE INVENTION

The invention comprises a teaching device for visually illustrating computations to all bases and indicating the relation between the base ten and other bases as by multiplication, division, addition, and also fractions.

SUMMARY OF THE INVENTION

The invention comprises a device to be used for self-instruction or by teachers in schools, to better enable students to understand the familiar base ten system and to understand the structure of numeration systems with all bases and to compute using the various bases. Additionally, the student can visually observe the several steps in addition, subtraction, multiplication and division in all bases without the use of addition and multiplication tables.

The teaching device may be expanded to any base by incerasing the number of rows of counting beads and suitable cover cards. The device may also be of a size to hold in the hand, or to be mounted on a blackboard in a school room or a mobile floor model on a stand can be used.

One object of the invention is to enable both teacher and student to better understand the structure of the familiar base ten system and to understand the structure of numeration systems with base two to base ten and to compute using the various bases.

Another object of the invention is to provide a device for teaching computations to any base, and also teaching fractions in any base.

DESCRIPTION OF THE DRAWINGS

FIG. 1 of the drawing shows the base frame of the teaching device, for bases 2 to 10, provided with six spaced wires having nine beads on each wire. Above the wires are suitable means for pivotally mounting a plurality of base cards.

FIGS. 2 to 10 show base cards for calculations in the bases 2 to 10 respectively, and are of a size such that base 9 card when lowered over the base frame will leave eight beads exposed, base 8 card will leave only 7 beads exposed, each lower base card exposing a lesser number of beads until base 2 card exposes only one bead on each wire.

FIG. 11 shows the device adjusted for calculations to the base ten.

FIG. 12 shows the device adjusted for calculations to the base five.

PREFERRED EMBODIMENTS

Figures 1, 2, 3:
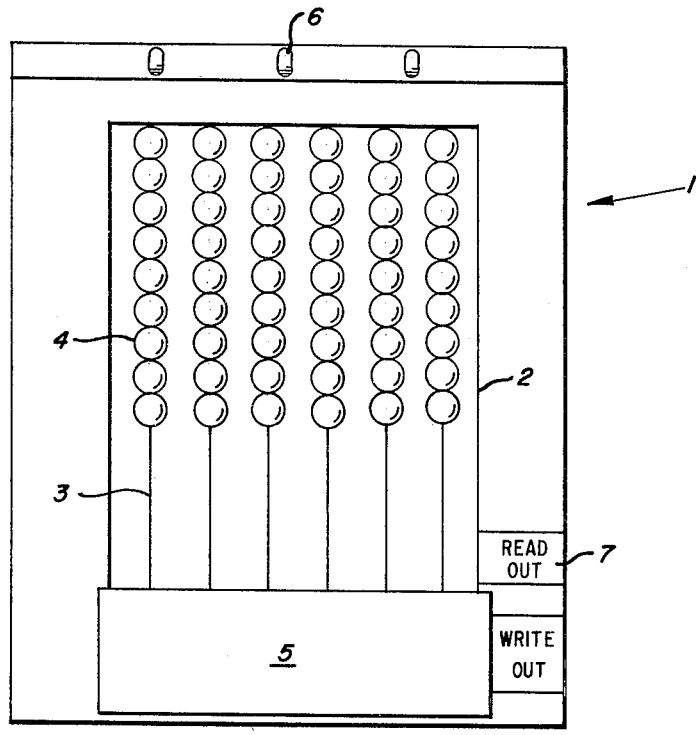

The teaching device of the invention, in its basic form, as shown in FIG. 1 of the drawing, comprises a suitable frame member 1 which may be rectangular and provided with a rectangular aperture 2 therethrough. Secured within aperture 2 are a plurality of vertically extending and transversely spaced rigid wires 3 and are shown to be six in number. Slidably mounted upon each wire 3 are a plurality of beads 4, nine in number and of an aggregate length less than the length of each wire supporting them. Above the wires 3 and hingeably supported upon said frame by members 6 are to be mounted a plurality of cards, referred to herein as base cards. That is, the bottom base card is referred to as a base ten card and the top base card is referred to as a base two card.

Figure 13:
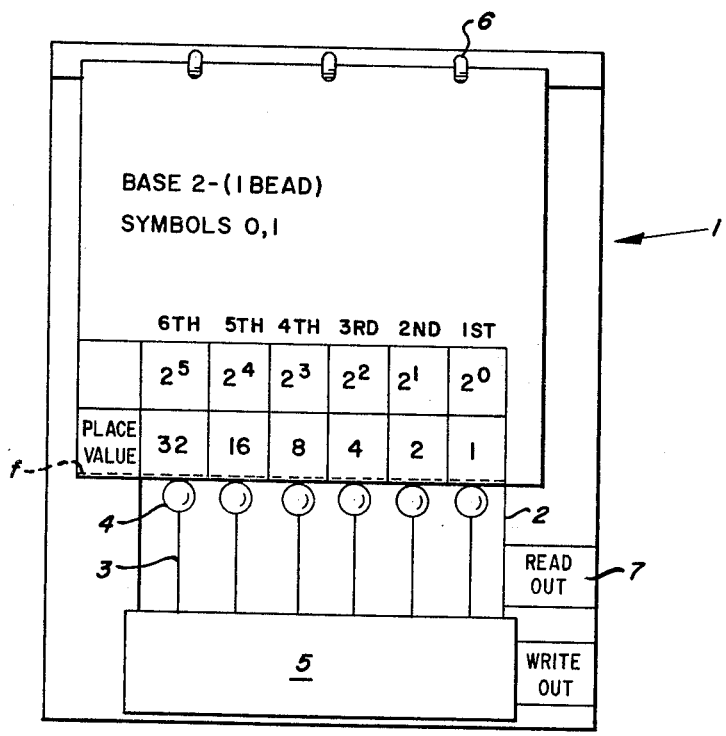
FIG. 13 shows the device adjusted for calculations in base two.

Base 10 card, as shown by FIG. 11, exposes 9 beads on each wire; base 9 card when lowered exposes 8 beads and so on, until base 2 card is lowered to expose only one bead on each wire, as shown by FIG. 13. Above each row of beads, each base card contains two rows of numerals, the upper row is the base-exponent row and the lower row is the place value row. The lower row (place value row) tells us the value of each bead in its respective column.

The bottom horizontal edge of base ten card terminates above the opening 2 in frame 1, as shown in FIG. 11. The base nine card overlaps the top row of beads and has an angular depending bottom flange $f$ having slotted openings therein which engages said wires 3 and overlaps the top row of beads 4. Base eight card similarly overlaps the next exposed row of beads, etc., so that the base two card, as shown by FIG. 13, overlaps all but the bottom bead of each row of beads. Below the aperture 2 of frame member 1, is a write out space 5 and above and to the right of the "write out" space is a "read out" space 7. The write out space 5 may be a tablet to receive pencil marks or a well known device comprised of a plastic sheet for imprint by a pencil or other marking device, an underlying recording sheet and a carbon sheet to record impressions on the top sheet.

Since numeration systems with bases other than ten are now taught at elementary and secondary levels, some students find it difficult to compute when they are limited to fewer than the familiar ten symbols 0, 1, 2, 3, 4, 5, 6, 7, 8, 9. Others find it more difficult to count in the base two using only the symbols 0 and 1. To best learn to use the device as a counter, set it up for the familiar base ten, as in FIG. 11, and as counting can be thought of as additions of ones, turn to the base ten card and move all beads 4 to the tops of their supporting wires. Under place value 1, pull down beads from 1 to 9 to the "read out section." Since another bead is necessary to make 10, but no more beads are available under place value 1, a bead must be taken down from the column place value 10 and then return all 9 of the "one" place value beads. Continuing to pull down beads in the 1 column the number in the write out section is now 19 (1—10+9—1). To reach 20, one must move back all nine 1 beads and pull down a second 10 bead. Continued counting in this manner moves all the 1 and 10 beads to the read out section. Now pull down one (hundreds) bead and give back the nine "tens" beads and nine "one" beads. In the write out section, write 100, meaning you have 1 (100), 0 (10) and 0 (1). Note that in base 10, the symbols used were 0, 1, 2, 3, 4, 5, 6, 7, 8, 9.

Referring now to counting in another base, such as base five. Move all beads to top of their supports and turn down the base five card as shown in FIG. 12. Four beads will be exposed below the card and the symbols for use in the write out section will be 0, 1, 2, 3, and 4. Again counting by "ones," take down beads 1, 2, 3, and 4 from the place value 1 column. Needing one more to make "5" take down one "five" bead and return the (4) one beads on the first column. The five would be written as $10_5$ and read as "one zero to the base 5." This means you have 1 (5) and 0 (1). Thus five to the base ten is equivalent to 10 (read one zero not ten) to the base 5, or $5_{10}=10_5$. In the same manner $10_{10}=20_5$; $12_{10}=22_5$ and $16_{10}=31_5$.

To change a number written in base 5 such as $2432_5$ to its equivalent in base 10, using the base 5 card, take down two beads in the fourth colum, four beads in the third column, three beads in the second column, and two beads in the first column. Noting the value of each bead in the place value (bottom row on base cards). Thus $2432_5$ means you have 2 (125's), 4 (25's), 3 (5's) and 2 (1's). Adding these place values together we have: 2 (125)=250, 4(25)=100, 3 (5)=15 and 2 (1)=2 or $$250+100+15+2=367$$

hence $2432_5=367_{10}$

To change from 2632 in base ten to another base, such as base 5, turning to base 5 card, four beads are exposed in each column. The "place value" row indicates that 2632 is less than 3125 but greater than 625. Proceed to divide 2632 by 625 to find how many 625's there are in 2632.

$$\begin{array}{r}4\\625\overline{)2632}\\2500\\\hline 132\end{array}$$

There being 4 (625's) in 2632 and 132 remaining. Pull down the 4 (625's) beads in the fifth column. Next divide 132 by 125 to see how many 125's there are in 132.

$$\begin{array}{r}1\\125\overline{)132}\\125\\\hline 7\end{array}$$

Thus there is one (1) 125 in 132 with 7 remaining. Pull down one 125's bead in the fourth column. Obviously, there are no 25's in 7 so one does not pull down any beads in the 25's column. Dividing 7 by 5, there is one (5) in 7 and 2 remaining. Pull down one (5)'s bead. Pull down two (1's) in the first column. In the read out section, there are four (625's) beads, one (125's) bead, no (25's) bead, one (5's) bead and two (1's) beads. This result is written $41012_5$.

The same result can be done in one operation thus—

$$\begin{array}{r}4\\625\overline{)2632}\\2500\\\hline 125\overline{)\ 132}\ (1\\125\\\hline 25\overline{)\ \ \ 7}\ (0\\0\\\hline 5\overline{)\ \ \ 7}\ (1\\5\\\hline 1\overline{)\ \ \ 2}\ (2\\2\end{array}$$

Thus written down the quotients starting from the top $41012_5$

To change $2632_{10}$ to base seven, turn to base 7 card, having six beads exposed in each column. From the place values, it is obvious one must start dividing by 2401, thus:

$$\begin{array}{r}1\\2401\overline{)2632}\\2401\\\hline 343\overline{)\ 231}\ (0\\0\\\hline 49\overline{)231}\ (4\\196\\\hline 7\overline{)\ 35}\ (5\\35\\\hline 1\overline{)\ 0}\ (0\end{array}$$

Checking these results with the base 7 card, pull down one (2401's) bead, no (343's) bead, four (49's) beads, five (7's) beads, and no (1's) bead. Thus $$2401+0+196+35+0=2632$$

Therefore, $2632_{10}=10450_7$.

The preceding can be summarized as follows:

(1) Divide by the highest power of the new base, which can be used as a divisor.

(2) Divide the remainder by the next lower power of the base even though the new quotient is zero.

(3) Divide by each lower power until 1 has been used as a divisor and the remainder is zero.

To change any number of any base to another base other than ten, first find the equivalent in the base ten and then change to the desired base, following the procedures set forth above.

ADDITION

To use the device for the study of addition in different bases, consider first addition in the base ten. In this study of addition, it will be helpful to think in terms of "taking and giving back." Thus, in the use of the device, if you must add "2" take "5" and give back 3, or take 9 and give back 7, etc.

Referring now to the base ten card, consider the addition of $27_{10}$ to $93_{10}$; pull down "two" beads in the 10's column and 7 beads in the 1's column. Thus, you have pulled down a total of 27 (2 tens and 7 ones). To this you must add 93 (9 tens and 3 ones). Not having 3 beads at the top of the first column, but only 2 beads, pull down 1 tens bead and give back 7 ones. Next add 9 tens bead, there being only 6 tens bead at the top of the 10's column, draw down 1 one hundreds bead and give back one tens bead. Thus in the "read out" space we now have $1(100)+2(10)+0(1)$ or 120.

Consider now addition in the base (3), as $211_3+122_3$. Turn to the base (3) card with two beads below the card. Pull down 1 bead in 1's column, 1 bead in the 3's column and 2 beads in the 9's column. To add 2 beads in the 1's column where only 1 bead is available, pull down 1 bead in the 3's column and give back one 1's bead. Thus taking 3 and giving back one, has added 2. Next to add two 3's bead with no such 3 beads or 9 beads available, take down one 27's bead and give back two 9's beads and one 3's bead. That is 27 was added but 21 was given back so that actually 6 was added. Now take one 9's bead down in the third column.

In the read out section is $1110_3$ as the sum of $$211_3+122_3$$

Thus, $1110_3$ is $1(27)+1(9)+1(3)+0(1)=39$. Addition in the other bases is performed in the same manner.

Consider subtraction to any base, such as $1110_3-122_3$, the answer is $211_3$. To illustrate this turn to base card 3. Set up $1110_3$ in the read out section. The procedure is to give back $122_3$, that is two (1's), two (3's) and one (9) from $1110_3$.

Not having two (1's) in the read out section, give back 1(3's) and take back 1(1's) bead. Next, it is required to give back 2(3's) or 6. There being no (3's) bead give back 1(9) bead and take back 1(3) bead. To give back 1(9) bead, give back 1(27's) bead and take down 2(9's) beads. In the read out section, therefore, you have $211_3$; $1110_3-122_3=211_3$.

The teaching device can, if desired, be extended to any base. For example, base sixteen, which an addition to base two is used in computers. Base sixteen would contain 15 beads in each column and the symbols would be 0, 1, 2, 3, 4, 5, 6, 7, 8, 9, A, B, C, D, E, and F; where A is 10, B is 11, C is 12, D is 13, E is 14, F is 15 and 10 (read one zero) is 16, 11 is 17, 12 is 18, 13 is 19, etc. The teaching device can be modified to teach fractions in any base by adding columns of beads to the right of the beads representing the "ones" column.

These cards would be the base to negative powers instead of to positive powers. A number, in this case called a base, to a negative power represents a fraction. For example, the card for the base 2, would read from left to right as follows, $$2^{-1} \; 2^{-2} \; 2^{-3} \; 2^{-4} \; 2^{-5}$$
$$1/2 \; 1/4 \; 1/8 \; 1/16 \; 1/32$$

instead of as shown in FIG. 2. The cards for other bases would be similarly constructed.

I claim:

1. A teaching device for the better understanding and use of numeration systems with bases of two to ten and of other bases and to compute using said various bases comprising:
   a base frame having a central rectangular cut out section therethrough, with at least six vertically extending and transversely spaced rods mounted within said cut out section;
   nine beads slidably mounted upon each of said rods within said section for a portion of the length of each of said rods;
   a plurality of base cards hingedly disposed transversely of said base frame above said cut out section and adapted to overly some of the beads thereon, each said base card being of progressively increasing vertically depth such as to expose one less bead on each transversely spaced rod than the numerical value of the base number displayed on said card, said cards identifying the base being used, the number of beads on each rod exposed beneath said base card for computing in the selected base, the value of each bead exposed upon the underlying rod when the base chosen is raised from zero power to the fifth power on successive rods and the place value of each bead on rods one to six.

2. The device as defined in claim 1 wherein the base frame has at one side of the opening therein a designation "read out" and below the base frame a space for inserting the place value below each bead remaining in the "read out" section after completion of a calculation upon the device.

3. A teaching device of the character described for the better understanding and use of numeration systems to any desired base and to compute using the selected base, comprising;
   a base frame having a central cut out section therein with a plurality of vertically disposed transversely spaced wires mounted in said cut out section,
   a plurality of beads slidably mounted upon each of said wires and having an accumulated length less than the length of the mounting wire,
   a plurality of base cards pivotally mounted upon said base frame adjacent one end of said wires for selectively folding downward over said wires and the beads thereon, each said base card being of progressively increasing vertical depth such as to expose one less bead on each transversely spaced wire than the numerical value of the base number displayed on said card, and
   indicia on each base card identifying the base being used, the place value of each exposed bead on each of said wires below the card and the power to which the base identified by the card is raised to provide said place value.

4. The teaching device as defined in claim 3 wherein means are provided on the base frame and below each of said wires for indicating the numerical value of each bead remaining at the base of each wire at the completion of any computation.

References Cited

UNITED STATES PATENTS

| | | | |
|---|---|---|---|
| 692,019 | 1/1902 | Kolshorn | 35—32 X |
| 2,646,631 | 7/1953 | Lazar | 35—33 |
| 3,138,879 | 6/1964 | Flewelling | 35—32 |
| 3,273,262 | 9/1966 | Smith | 35—33 |

FOREIGN PATENTS 587,220   4/1947   Great Britain.

EUGENE R. CAPOZIO, Primary Examiner

W. H. GRIEB, Assistant Examiner